(12) United States Patent
Kim et al.

(10) Patent No.: US 7,236,581 B2
(45) Date of Patent: *Jun. 26, 2007

(54) METHOD FOR PROVIDING SUBSCRIBER-BASED RINGBACK TONE WITH NO PROGRESS TONE

(75) Inventors: Ki Mun Kim, Incheon-si (KR); Yeong Tae No, Seoul (KR); Sang Yun Lee, Seongnam (KR); Hee Hyeok Hahm, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/523,837

(22) PCT Filed: Jul. 28, 2003

(86) PCT No.: PCT/KR03/01505

§ 371 (c)(1),
(2), (4) Date: Jul. 21, 2005

(87) PCT Pub. No.: WO2004/016014

PCT Pub. Date: Feb. 19, 2004

(65) Prior Publication Data

US 2006/0013376 A1    Jan. 19, 2006

(30) Foreign Application Priority Data

Aug. 9, 2002    (KR) ............... 10-2002-0047033

(51) Int. Cl.
*H04M 3/42* (2006.01)
*H04M 1/00* (2006.01)
(52) U.S. Cl. ............... 379/207.16; 379/374.01
(58) Field of Classification Search .......... 379/207.16, 379/372, 374.01, 386, 418; 455/414.2, 414.3
See application file for complete search history.

(56) References Cited

U.S. PATENT DOCUMENTS

| 5,926,537 | A | 7/1999 | Birze |
| 6,574,335 | B1 * | 6/2003 | Kalmanek et al. .......... 379/386 |
| 7,006,622 | B2 * | 2/2006 | Laine .................... 379/374.01 |

FOREIGN PATENT DOCUMENTS

| JP | 2001-128247 | 5/2001 |
| KR | 1020000000244 | 1/2000 |
| KR | 1020000012224 | 3/2000 |

* cited by examiner

*Primary Examiner*—Bing Q. Bui
(74) *Attorney, Agent, or Firm*—Lowe Hauptman & Berner LLP

(57) ABSTRACT

The present invention relates to method for providing a calling subscriber with an arbitrary sound chosen by a called subscriber instead of a common ringback tone (RBT) with no progress tone. In this present invention, if a call is generated, a terminating exchanger starts paging of the called and simultaneously requests a trunk connection to a sound db server without waiting acknowledgement of the paging from the called based on the first information on whether or not to replace an RBT and the second information on a route to the sound db server that have been received from a home location register (HLR), and provides a called subscriber identification for the sound db server. Then, the sound db server searches its db for a sound specified by the called, and provides the found sound for the caller instead of a conventional RBT via the terminating exchanger connected through a trunk. Through this sequential procedure of network elements, a caller can hear a sound specified by a called instead of a dry RBT with no progress tone.

12 Claims, 7 Drawing Sheets

FIG. 7

| Parameter=CallingFeaturesIndicator2 | | | | | | | | Length=V | Tag=H'9fff7d |
|---|---|---|---|---|---|---|---|---|---|
| Contents | | | | | | | | meaning | |
| H | G | F | E | D | C | B | A | Octet | Notes |
| VMSB | | VMSU | | MC | | CC | | 1 | |
| FMSNA | | FMSB | | FMSU | | VMSNA | | 2 | a |
| SRBT | | NCW | | Prefer_Sys | | MUDN | | 3 | |
| ・・・・・・・・・・ | | | | | | | | n | |

*defined 'reserve' field before* ured as FIG. 2.

METHOD FOR PROVIDING SUBSCRIBER-BASED RINGBACK TONE WITH NO PROGRESS TONE

CROSS REFERENCE TO RELATED APPLICATION

This application is the National Phase application of International Application No. PCT/KR2003/001505, filed Jul. 28, 2003, which designates the United States and was published in English. This application, in its entirety, is incorporated herein by reference.

TECHNICAL FIELD

The present invention relates to method for providing an arbitrary sound chosen by a called subscriber for a calling subscriber instead of a conventional ringback tone without a progress tone.

BACKGROUND ART

When a subscriber calls another through a mobile communication network, a terminating exchanger on the network provides the caller with a uniform ringback tone.

Since the ringback tone is same all the time, a caller can not identify a called before the called answers. Furthermore, the uniform ringback tone can not satisfy various subscribers' needs to reveal their individuality.

By the way, various ad methods are being proposed in these days. One of these ad methods is to send an ad sound message to a caller instead of a conventional ringback tone. However, such an ad sound message is chosen unilaterally by a network operating enterprise. If a caller heard such a unilateral ad sound he or she could talk over a mobile telephone with a called for a limited time.

However, the method that an ad sound is provided instead of a conventional common ringback tone still has the aforementioned drawbacks. That is, a caller can not identify a called before the called answers and the uniform ringback tone can not satisfy various subscribers' needs to reveal their individuality.

DISCLOSURE OF INVENTION

It is an object of the present invention to provide a method for providing an arbitrary sound chosen or registered by a called subscriber for a caller instead of a conventional RBT (RingBack Tone). In the present method and apparatus, an arbitrary RBT-replacing sound chosen or registered by a subscriber is stored in a server separated from mobile exchangers first, and if a certain subscriber is called, a terminating exchanger for the call receives from the server an RBT-replacing sound that is assigned to the called, and then provides the received sound for a caller instead of a conventional RBT.

It is another object of the present invention to provide a method for providing an arbitrary sound chosen or registered by a called subscriber for a caller instead of a conventional RBT without a progress tone that is ordinarily transmitted to a caller while state of the called subscriber is being checked.

A method of providing an arbitrary sound without a progress tone as an RBT in accordance with the present invention is characterized in that it comprises the steps of: an HLR's (Home Location Register's) furnishing an exchanger, when a terminal is registered to the exchanger, with first information on whether a common RBT is to be replaced or not for the terminal and second information informing a route to a sound providing means; the call-terminating exchanger's starting paging of the terminal if the terminal is called and simultaneously requesting a trunk connection to the sound providing means based on the first and the second information without waiting acknowledgement of the paging from the terminal while furnishing with called-identifying information; and the sound providing means' determining an RBT-replacing sound based on the called-identifying information, and providing the determined RBT-replacing sound for a caller through the call-terminating exchanger the trunk connection is made to.

If the call-terminating exchanger detects that the call is answered while the determined RBT-replacing sound is being provided for the caller, it requests the sound providing means to release the established trunk connection to terminate transmission of the RBT-replacing sound.

The above-characterized method and apparatus provides a personal ad way by allowing a registered personal introducing or identifying sound to be used instead of an RBT. In addition, a caller is able to know by only hearing an RBT-replacing sound whether he or she called rightly. An enterprise as well as individual persons can advertise efficiently through registering an RBT-replacing sound.

In addition, an RBT-replacing sound can be provided for a caller continuously and smoothly with no progress tone even during wireless paging for checking state of a called terminal.

BRIEF DESCRIPTION OF DRAWINGS

In the drawings:

FIG. 2 is a simplified diagram of a mobile communication network which a subscriber-based RBT-replacing sound providing method is embedded in;

FIG. 7 shows format of the value-added service parameters including an RET-replacing service field that are delivered from an HLR to a call-terminating exchanger.

MODES FOR CARRYING OUT THE INVENTION

In order that the invention may be fully understood, a preferred embodiment thereof will now be described with reference to the accompanying drawings.

Figure 1:
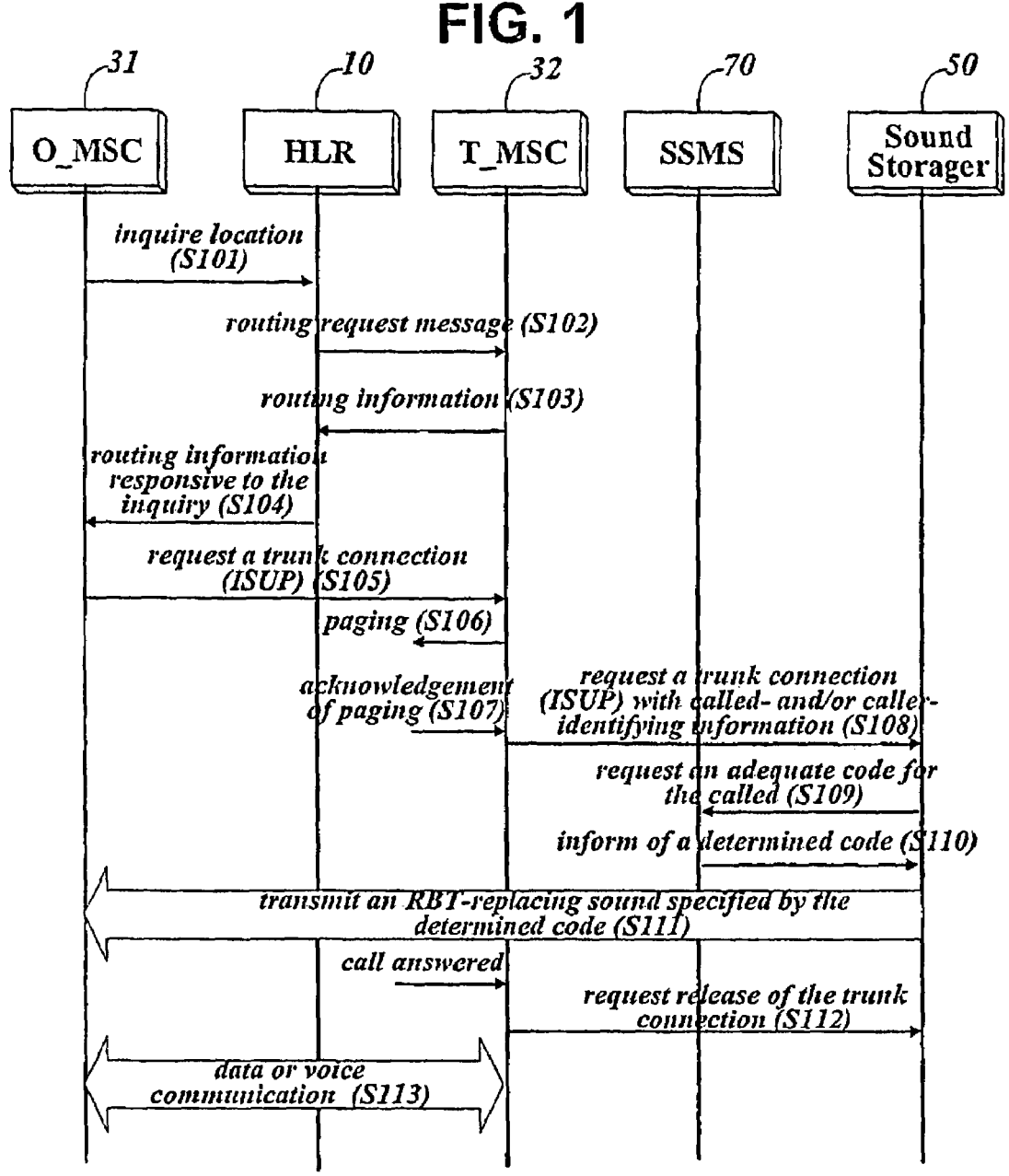
FIG. 1 is a procedure chart of an embodiment of a subscriber-based RBT-replacing sound providing service in accordance with the present invention.

FIG. 1 is a procedure chart of an embodiment of the present invention to conduct a subscriber-based RBT-replacing sound providing service. The procedure of FIG. 1 is conducted through a mobile communication network structured as FIG. 2.

Figure 2:
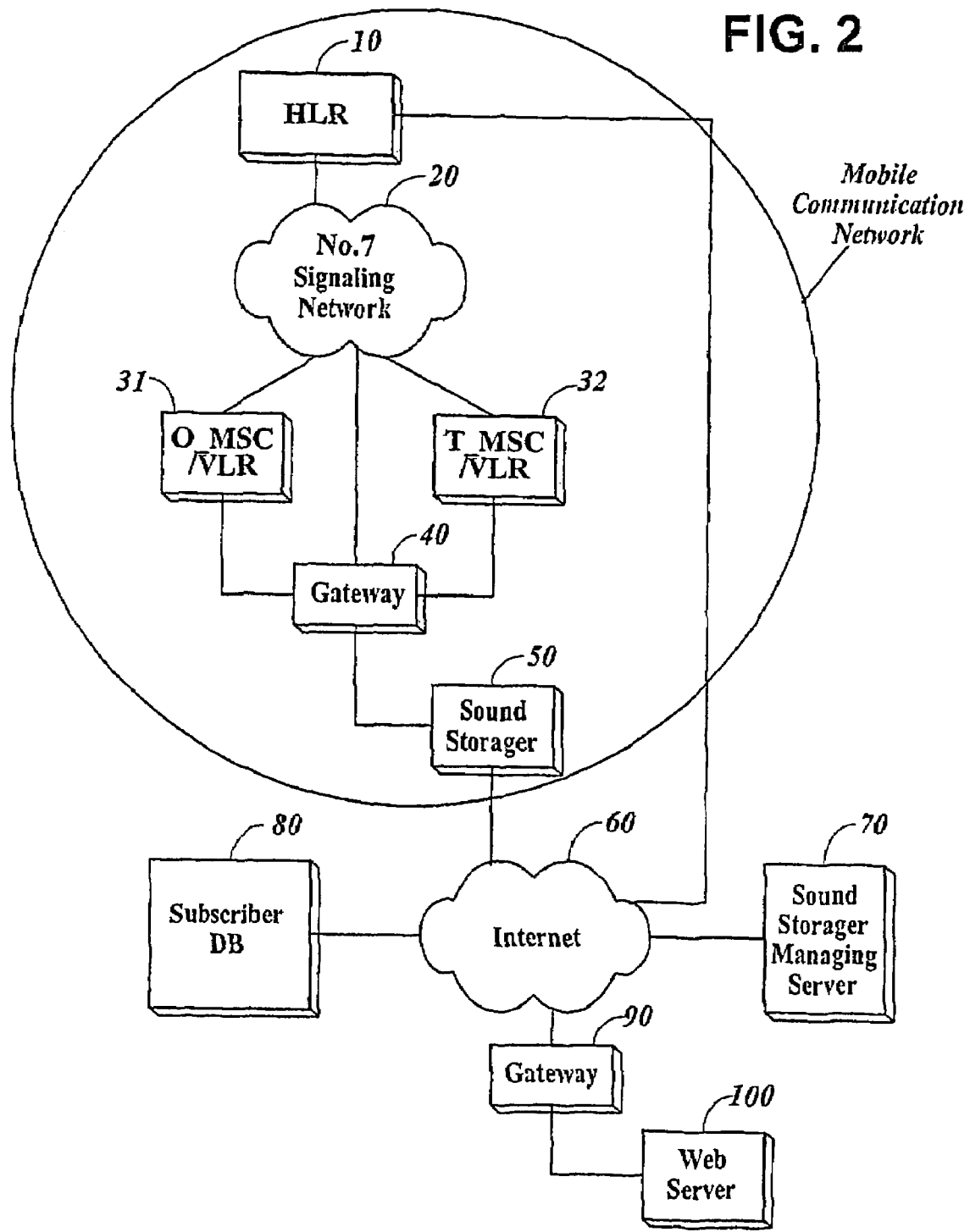

The network of FIG. 2 includes an HLR (Home Location Register) 10; mobile exchangers 31 and 32 (also called 'MSC' (Mobile Switching Center)) being capable of communicating with the HLR 10 via a No. 7 signaling network 20 based on No. 7 signaling transfer protocol; a sound storager 50, connected to the No. 7 signaling network 20 via a gateway 40, storing RBT-replacing sounds and communicating with the exchangers 31 and 32; an SSMS (Sound Storager Managing Server) 70, connected to the sound storager 50 via Internet 60, controlling management of RBT-replacing sounds in the sound storager 50; a subscriber db 80 connected to the HLR 10 via Internet 60; and a web server 100, connected to Internet 60 via a gateway 90, communicating with the sound storager 50 and the SSMS 70.

The HLR 10 functions as a conventional network element and it has in every subscriber profile the first information on whether RBT is to be replaced or not and the second information informing a route to the sound storager 50. The first and the second information are written in the value-added service parameters of each subscriber profile.

Either of the mobile exchangers 31 and 32 functioning as conventional network elements receives the first and the second information of a subscriber through communicating with the HLR 10 when the subscriber requests location registration. If the location-registered subscriber is called, the exchanger 31 or 32 receives an RBT-replacing sound from the sound storager 50 based on the received first and second information, and then provides a caller with the received RBT-replacing sound.

The sound storager 50 stores a plurality of digital sounds to be used for replacing an RBT. The stored digital sounds are provided for the exchangers 31 and 32 via the gateway 40.

The SSMS 70 communicates with the sound storager 50 via Internet 60 and it chooses a digital sound based on information written in an RBT service table. A unique code to identify the chosen digital sound is notified the sound storager 50 in order that a stored sound identified by the code is sent to the exchanger 31 or 32 from the sound storager 50. The RBT service table used for choice of a digital sound allocated for each subscriber includes several codes linked to caller's personal information, caller or caller-group identifying information, and/or call time zone. Therefore, a digital sound can be chosen by the SSMS 70 based on who calls, which group a caller belongs to, age, sex, or occupation of a caller, and/or when a subscriber is called.

Information in the RBT service table is determined when a person subscribes to the value-added service and is then modified by his or her request.

The web server 100, connected to the sound storager 50 and/or the SSMS 70 via Internet 60, adds digital sounds to the sound storager 50 and conducts operations to update or change contents of the RBT service table and codes, if necessary, related digital sounds for the SSMS 70. The updating or changing operation is initiated by subscriber's request through web pages of the web server 100.

The procedure depicted in FIG. 1, an embodiment of the present invention, conducted through the network of FIG. 2 is described in detail below.

If an arbitrary subscriber within a service zone of the exchanger 31 calls another subscriber within the exchanger 32 who has subscribed to the RBT replacement service, the originating exchanger 31 sends a location request message to the HLR 10 to inquire where the called is (S101). Then, the HLR 10 sends a routing request message to the terminating exchanger 32 (S102), and the terminating exchanger 32 informs the HLR 10 of routing information, e.g., TLDN (Temporary Local Directory Number) in response to the routing request message (S103).

The HLR 10 delivers the routing information to the originating exchanger 31 in response to the inquiry step S101 (S104). The originating exchanger 31 requests the terminating exchange 32 based on the routing information to make a trunk connection therebetween (S105). The call for trunk connection is called 'ISUP' in common.

In the meantime, the terminating exchanger 32 transmits a paging signal to check state of a called terminal (not shown) (S106) the moment the trunk connection request is received at the step S105. If the paging signal is acknowledged from the called terminal (S107), the terminating exchanger 32 checks locally-stored information related with RBT replacement service (RBTRS) for the called, that was received from the HLR 10 when location of the called is registered. If the RBTRS-related information of the called is indicative of 'in-service' and 'activated', the terminating exchanger 32 makes a trunk connection to the sound storager 50 with reference to the RBTRS-related information (S108). At this time, mobile telephone numbers of the caller and the called are sent to the sound storager 50.

Now, respective trunk connections are made between the originating exchanger 31 and the terminating one 32 and between the terminating exchanger 32 and the sound storager 50.

The sound storager 50 asks an adequate code to the SSMS 70 while providing the received numbers for the SSMS 70 (S109). The SSMS 70 examines an RBT service table allocated for the called number to determine a code matched with the calling number (if received), and informs the sound storager 50 of the determined code (S110) in response to the code-requesting step S109. The sound storager 50 transmits an RBT-replacing sound corresponding to the determined code to the caller through the trunk connections between the sound storager 50 and the terminating exchanger 32 and between the terminating exchanger 32 and the originating one 31 (S111).

If the called answers call arrival from the terminating exchanger 32 while the determined RBT-replacing sound is being transmitted instead of a conventional RBT, the terminating exchanger 32 requests the sound storager 50 to release the established trunk connection (S112). Then, voice or data are communicated between the caller and the called through the trunk connection between the originating 31 and the terminating exchanger 32 (S113).

In the meantime, a progress tone, which is very similar to RBT in sound, is transmitted to the caller during a waiting time from start of paging to acknowledgement of the paging from the called. If a battery of the called terminal is all out or the called terminal is out of a service area, namely, out of a wireless signal reachable area, the paging can not be acknowledged. In this case, a caller hears a dry progress tone for relatively long time until an RBT-replacing sound chosen by the called is provided for a caller.

The above subscriber-based RET sound providing service can be substantially embodied through the mobile communication network of FIG. 2 as follows.

When a subscriber applies for subscription to the value-added service of RBT replacement, all information included in the application is stored in the subscriber db 80 that requests registration of RBT replacement service to the HLR 10. Then, the HLR 10 writes necessary information in value-added service parameters of that subscriber.

Afterwards, if location registration for that subscriber is requested from a serving exchanger 31 or 32, e.g., the exchanger 32 the HLR 10 provides RBT service-related information and routing information for the exchanger 32 that requested location registration. The routing information is needed to make a trunk connection to the sound storager 50. The exchanger 32 registers the received information for that subscriber in a local subscriber db.

If an arbitrary subscriber at the exchanger 31 calls the location-registered subscriber, a trunk connection 'ISUP' is made between the originating 31 and the terminating exchanger 32 after routing information exchange through the HLR 10. After a trunk connection is setup, the terminating exchanger 32, knowing based on the registered information of the called subscriber that RBT replacement service is ON, makes another trunk connection to the sound storager 50 addressed by the registered information. At the same time, the terminating exchanger 32 provides the sound storager 50 with information of the called subscriber, e.g., mobile telephone number and starts to page the called.

The sound storager 50 inquires of the SSMS 70 about which digital sound is set now for the called subscriber. Then, the SSMS 70 informs the sound storager 50 of a code for digital sound having been chosen for a given condition by the called.

The sound storager 50 sends a digital sound identified by the received code to the originating exchanger 31 through the setup trunk connection between the two exchangers 31 and 32. The originating exchanger 31 transmits the digital sound from the sound storager 50 to the caller until the called answers the call. Thus, the caller can hear the digital sound instead of a conventional RBT during the paging. The moment the called answers the paging, the terminating exchanger 32 releases the trunk connection established to the sound storager 50. The conversation between the caller and the called is communicated through the trunk connection made between the originating 31 and the terminating exchanger 32.

Figure 3:
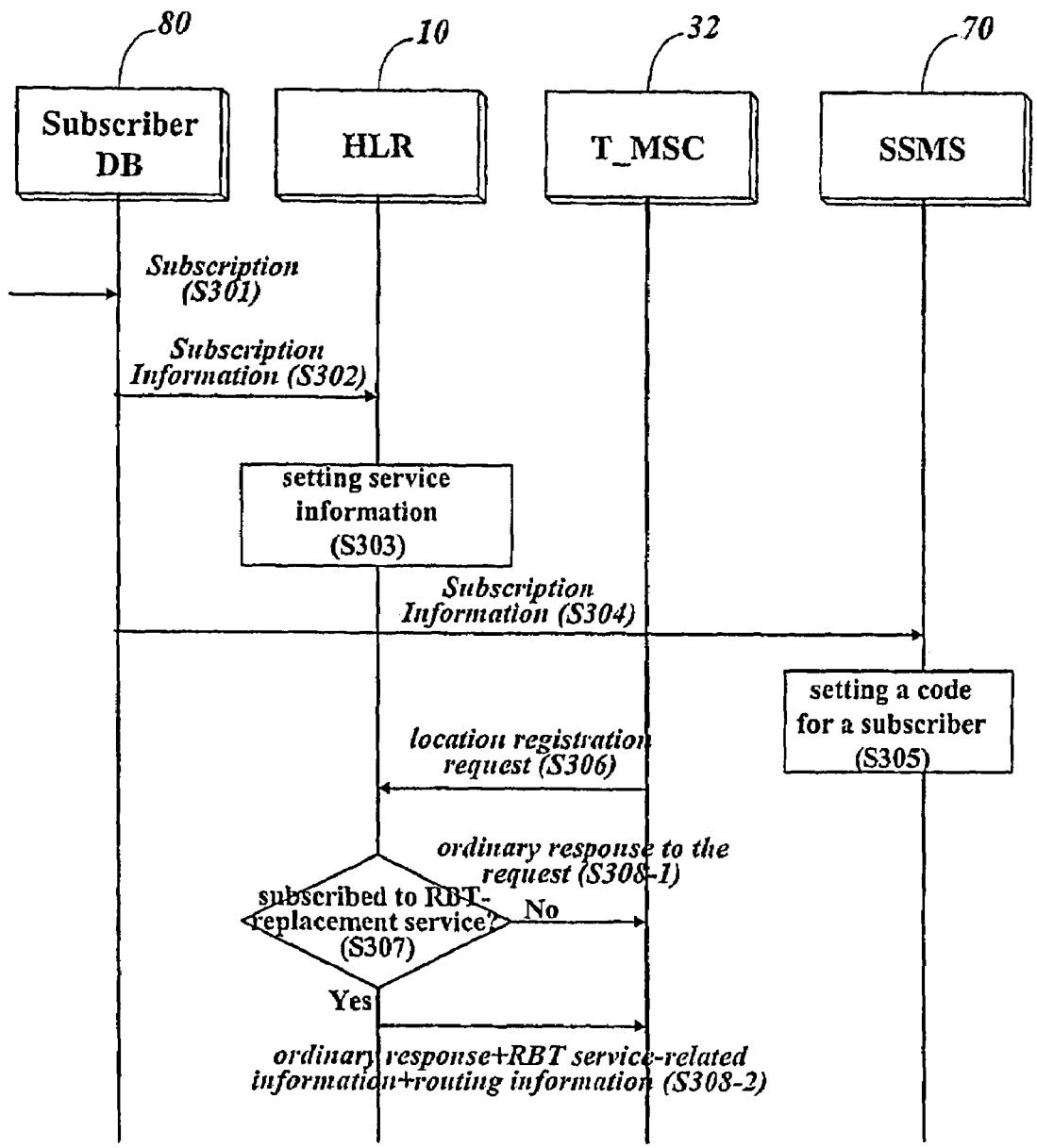
FIG. 3 is a procedure chart to subscribe to a subscriber-based RBT-replacing sound providing service in accordance with the present invention.

FIG. 3 is a procedure chart to subscribe to a subscriber-based RBT-replacing sound providing service in accordance with the present invention.

If subscription to the RBT-replacement service is asked (S301), subscription information including mobile telephone number of the subscriber is stored in the subscriber db 80 first and is then delivered to the HLR 10 (S302). The HLR 10 updates service information of the subscriber profile to indicate that the subscriber has subscribed to RBT replacement service (S303).

In addition, the subscriber db 80 also sends the subscription information including a chosen digital sound and mobile telephone number to the SSMS 70 (S304). The SSMS 70 writes a code associated with the chosen digital sound in an RBT service table allocated for that mobile telephone number (S305).

If the received subscription information includes particulars of sound assignments, namely if the received subscription information assigns different digital sounds for each caller, each caller group, and/or each time zone, the SSMS 70 writes different codes of the respective digital sounds in each condition field of the RBT service table, at the step S305.

Afterwards, if location registration for the subscriber is requested from the exchanger 32 to the HLR 10 (S306), the HLR 10 checks profile of the subscriber to know whether the subscriber has been subscribed to the RBT replacement service (S307). If not subscribed, the HLR 10 sends an ordinary response message to the location registration request to the exchanger 32 as in the conventional request processing procedure (S308-1). However, if subscribed, the HLR 10 sends the exchanger 32 a response message including RBT service-related information and routing information, e.g., routing digits to direct to the sound storager 50. The exchanger 32 registers the received information in the subscriber's profile on a local db, e.g., a VLR (Visitor Location Register) (S308-2).

The RBT service-related information can be carried by an SRBT (Specific RBT) field, which was defined as a 'reserve' field before, of the value-added service parameters 'CallingFeaturesIndicator2' shown in FIG. 7. The 2-bit SRBT field is set to '10' in case that the RBT replacement service is not activated even though that service is valid by subscription, and it is set to '11' in case that the RBT replacement service is in active state. A message including the parameters 'CallingFeaturesIndicator2' responsive to the location registration request is delivered from the HLR 10 to the exchanger 32.

The service information parameters 'CallingFeaturesIndicator2' of FIG. 7 are composed of a VMSB field indicative of state of voice mail service busy; a VMSU field indicative of state of voice mail service busy unconditional; a VMSNA field indicative of state of voice mail service busy no answer; an FMSNA field indicative of state of fax mail service no answer; an FMSB field indicative of state of fax mail service busy; an FMSU field indicative of state of fax mail service unconditional; an MC field indicative of multi-call; a CC field indicative of conference call; an MUDN field indicative of multiple unit directory number; and others.

Figure 4:
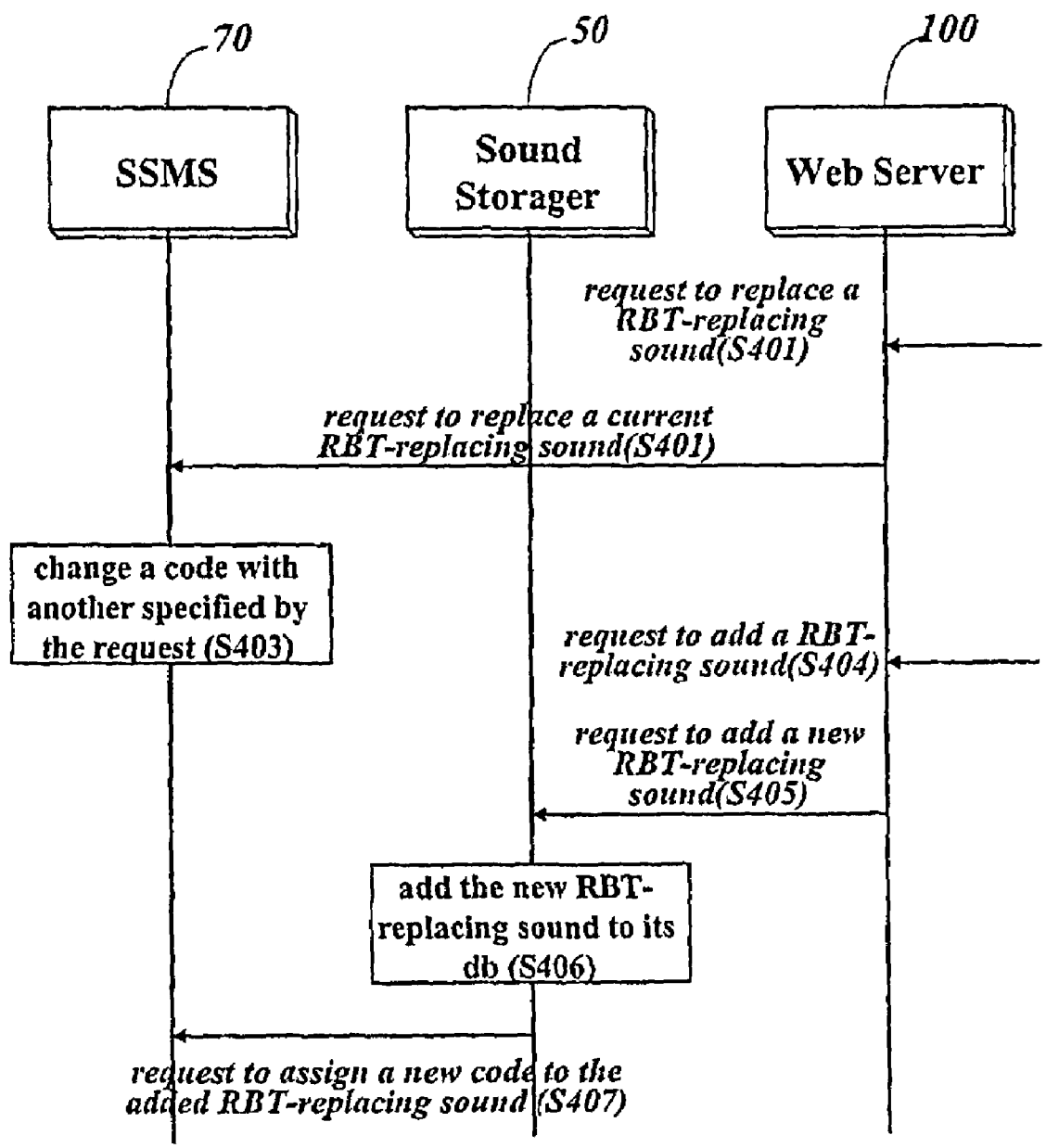
FIG. 4 is a procedure chart to change/add an RBT sound to be used in RBT-replacing sound providing service in accordance with the present invention.

FIG. 4 is a procedure chart to change/add an RBT sound to be used in RBT-replacing sound providing service in accordance with the present invention.

A subscriber, who has subscribed to the RBT replacement service according to the above-explained procedure of FIG. 3, connects his or her personal computer to the web server 100, first. Then, the web server 100 provides web pages on the connected computer screen to enable the subscriber to change/add information about RBT replacement service.

The subscriber enters mobile telephone number through an adequate web page and then selects a desired RBT-replacing sound from a list showing all or a part of sounds stored in the sound storager 50. If the subscriber requests change of RBT-replacing sound to the chosen one (S401), the web server 100 sends a change-requesting message to the SSMS 70 (S402). The SSMS 70 changes the current code with another code assigned to the chosen RBT-replacing sound in an RBT service table allocated for the entered mobile telephone number (S403). Afterwards, an RBT-replacing sound identified by the changed code will be provided instead of a conventional RBT.

If the subscriber selects to add a new RBT-replacing sound on a web page, the SSMS 70 provides an input web page. Then, the subscriber enters his or her mobile telephone number in the input web page and uploads a sound file including voice, sound logo, or music through the input web page (S404). The web server 100 requests the sound storager 50 to add a new RBT-replacing sound by delivering the inputted data to the sound storager 50 (S405). The sound storager 50 registers the uploaded sound file as a new RBT-replacing sound (S406) and requests the SSMS 70 to assign a new code to the registered RBT-replacing sound (S407). The SSMS 70 informs the sound storager 50 of the newly-assigned code and changes the current code with the newly-assigned code in an RBT service table allocated for the subscriber.

Figure 5:
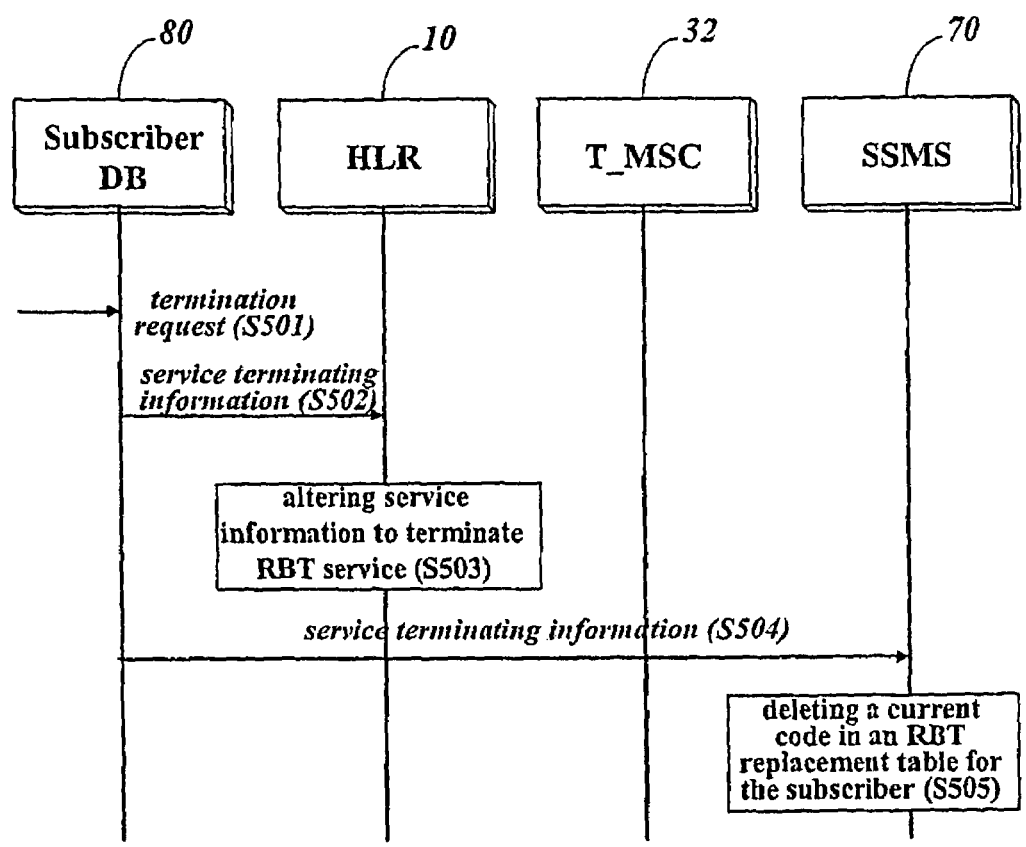
FIG. 5 is a procedure chart to terminate a subscriber-based RBT-replacing sound providing service in accordance with the present invention.

FIG. 5 is a procedure chart to terminate a subscriber-based RBT-replacing sound providing service in accordance with the present invention.

If termination of RBT replacement service is asked from a subscriber (S501), the subscriber db 80 deletes subscription information for RBT replacement service associated with the subscriber, namely, the subscriber's telephone number, and sends service terminating information including a mobile telephone number to the HLR 10 (S502). The HLR 10 alters service information of the subscriber's profile to indicate that the subscriber has not subscribed to RBT replacement service (S503).

The subscriber db 80 also sends the service terminating information to the SSMS 70 (S504), then the SSMS 70 deletes a current code, allocated at the step S305, in an RBT service table for the subscriber based on the received service terminating information (S505).

Figure 6:
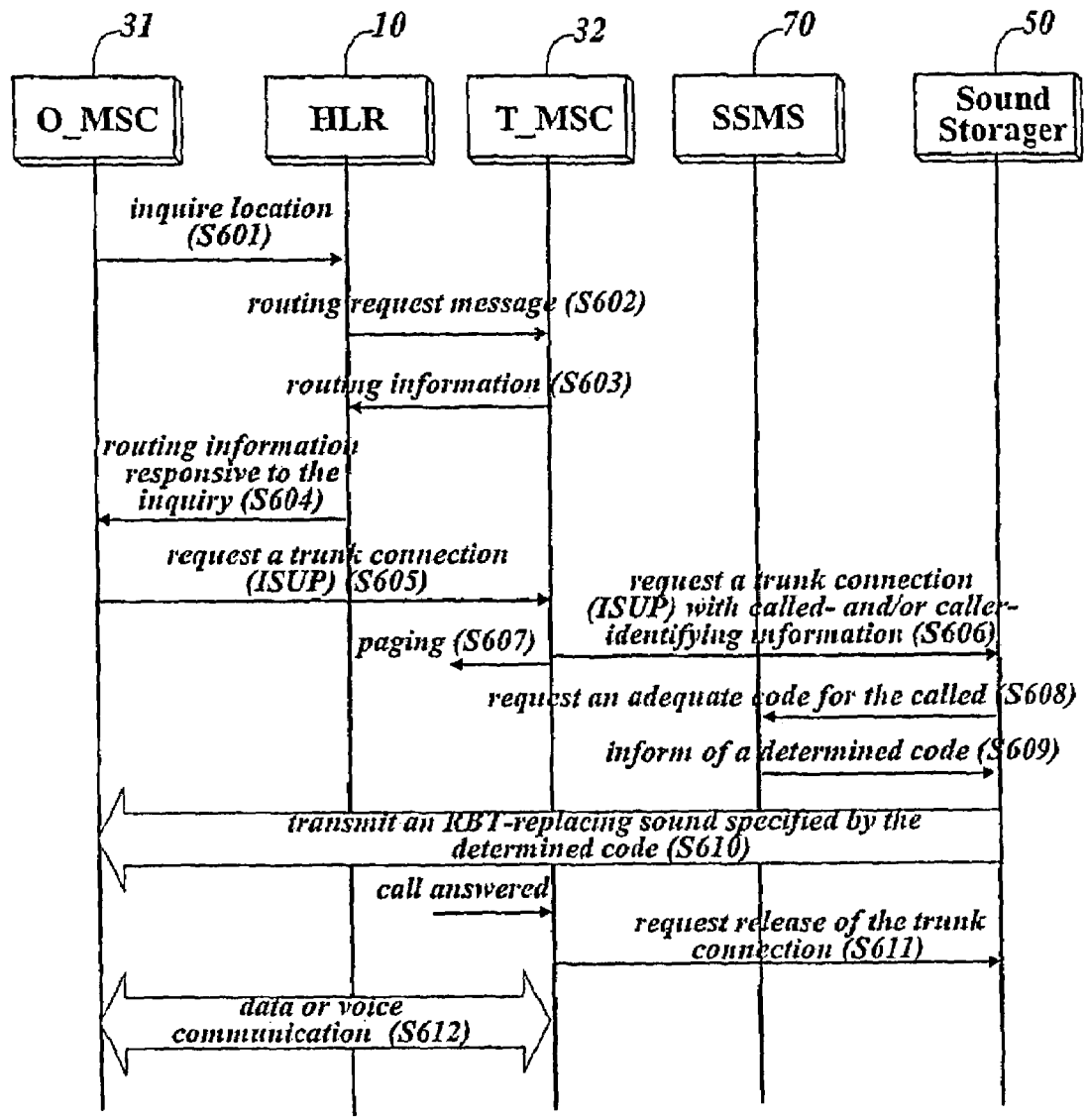
FIG. 6 is a procedure chart of another embodiment to provide a subscriber-based RBT replacing service with no progress tone in accordance with the present, invention.

FIG. 6 is a procedure chart of another embodiment of the present invention to conduct a subscriber-based RBT-replacing sound providing service. In this embodiment, no progress tone is transmitted to a caller.

If an arbitrary subscriber within a service zone of the exchanger 31 calls another subscriber, who has subscribed to the RBT replacement service, within the exchanger 32, the originating exchanger 31 sends a location request message to the HLR 10 to inquire where the called is (S601). Then, the HLR 10 sends a routing request message to the terminating exchanger 32 (S602), and the terminating exchanger 32 informs the HLR 10 of routing information, e.g., TLDN (Temporary Local Directory Number) in response to the routing request message (S603).

The HLR 10 delivers the routing information to the originating exchanger 31 in response to the inquiry step S601 (S604). The originating exchanger 31 requests the terminating exchange 32 based on the routing information to make a trunk connection therebetween (S605).

In the meantime, the terminating exchanger 32 checks the 'SRBT' field of the value-added service information of FIG. 7 that was registered for the called in its local db at the step S308-2 in the procedure of FIG. 3. If the two bits of the 'SRBT' field are '11' which means 'in-service' and 'activated', the terminating exchanger 32 makes a trunk connection to the sound storager 50 (S606) with reference to the routing information that was also received and stored at the step S308-2. At this time, mobile telephone numbers of the caller and the called are sent to the sound storager 50. While the above processes are conducted, a conventional RBT is not transmitted to the originating exchanger 31.

Especially, the trunk connection to the sound storager 50 at the step S606 is initiated at the same time as wireless paging (S607) or before the paging S607. That is, the trunk connection is requested to the sound storager 50 without waiting acknowledgement of the paging from the called terminal. This is to prevent a dry progress tone from being provided for a caller for a while, namely, from paging start to its acknowledgement. Although the paging is acknowledged from the called, a conventional common RBT is not transmitted to the caller until an RBT-replacing sound is provided from the sound storager 50.

As a result of the step S606, respective trunk connections are made between the originating exchanger 31 and the terminating one 32 and between the terminating exchanger 32 and the sound storager 50.

The sound storager 50 asks an adequate code to the SSMS 70 while providing the received numbers for the SSMS 70 (S608). The SSMS 70 examines an RBT service table allocated for the called number to determine a code matched with the calling number (if received), and informs the sound storager 50 of the determined code (S609) in response to the code-requesting step S608. The sound storager 50 transmits an RBT-replacing sound corresponding to the determined code to the caller through the trunk connections between the sound storager 50 and the terminating exchanger 32 and between the terminating exchanger 32 and the originating one 31 (S610). As a result, the caller can hear only RBT-replacing sound without a progress tone and a common RBT.

If the called answers the call arrival from the terminating exchanger 32 while the determined RBT-replacing sound is being transmitted instead of a common RBT, the terminating exchanger 32 requests the sound storager 50 to release the established trunk connection (S611). Then, voice or data are communicated between the caller and the called through the trunk connection between the originating 31 and the terminating exchanger 32 (S612).

In the present RBT-replacing sound providing service, a subscriber can access the HLR 10 to change the SRBT field of the value-added service parameters.

For instance, when a subscriber presses a special key on his or her mobile telephone the pressed key information is delivered to the HLR 10 which changes the 2-bit SRBT field based on the key information or alternately. However, more significant bit of the two can not be altered because it indicates whether or not subscribed to the RBT replacement service. Less significant bit can be altered by the above way because it indicates whether the RBT replacement service is activated or not.

Thus, in case of a person having subscribed to RBT replacement service, The SRBT field of the value-added service parameters for that person has a value of '10' or '11' only where the value '10' is indicative of 'inactive' of the service and '11' indicative of 'active'.

The special key commands change the 'SRBT' field from '10' to '11' or from '11' to '10'. Consequently, a subscriber can determine at will whether to use a conventional RBT or his or her RBT-replacing sound with no progress tone. If the 'SRBT' field is '10', a terminating exchanger transmits a conventional progress tone and a common RBT to a caller even if a called has subscribed to the RBT replacement service.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

The invention claimed is:

1. A method of providing an arbitrary sound as an RBT (RingBack Tone) without a progress tone in a communication network, comprising: a first step, conducted by an HLR (Home Location Register), of furnishing an exchanger, when a terminal is registered to the exchanger, with first information on whether a common RBT is to be replaced or not for the terminal and second information informing a route to a sound providing means; a second step, conducted by the call-terminating exchanger, of starting paging of the terminal if the terminal is called and requesting a trunk connection to the sound providing means based on the first and the second information without waiting acknowledgement of the paging from the terminal while furnishing with called-identifying information; and a third step, conducted by the sound providing means, of determining an RBT-replacing sound based on the called-identifying information, and providing the determined RBT-replacing sound for a caller through the call-terminating exchanger the trunk connection is made to.

2. The method of claim 1, wherein, at the second step, the terminating exchanger does not provide a progress tone for the caller during the paging.

3. The method of claim 1, wherein the call-terminating exchanger requests release of the trunk connection made to the sound providing means when the call is answered by the called, and wherein the sound providing means releases the trunk connection in response to the release request.

4. The method of claim 1, wherein the sound providing means determines the RBT-replacing sound specified for the called through communication with a storager controller operating based on internet protocol.

5. The method of claim 1, wherein the first information indicates whether an RBT is to be replaced or not and is set based on specific key information received from the called.

6. The method of claim 1, wherein the first and the second information are included in a response message to a location registration request message, the response message being sent from the HLR to the call-terminating exchanger.

7. The method of claim 6, wherein the first information is written in a reserve field allocated in value-added service parameters of subscriber's profile.

8. The method of claim 1, wherein a signal requesting the call connection to the called includes terminal identifying information of the called and the caller.

9. The method of claim 8, wherein the terminal identifying information of the called and the caller is subscriber telephone numbers of the called and the caller, respectively.

10. The method of claim 4, wherein the storager controller changes a sound code of an RBT-replacing sound specified for the called with another code through communication with a web server operating based on internet protocol.

11. The method of claim 10, wherein said another code is a code related with already stored RBT-replacing sound in the sound providing means or is a newly-assigned code for newly stored sound after received from the web server.

12. The method of claim 11, wherein, after being connected to the sound providing means and the storager controller, the web server changes the RBT-replacing sound based on subscriber identifying information entered through an input web page.

* * * * *